7752X
2 Sheets—Sheet 1.
J. DEAKYNE.
WHEAT FAN OR MACHINE FOR CLEANING GRAIN.
Patented Sept. 13, 1833.
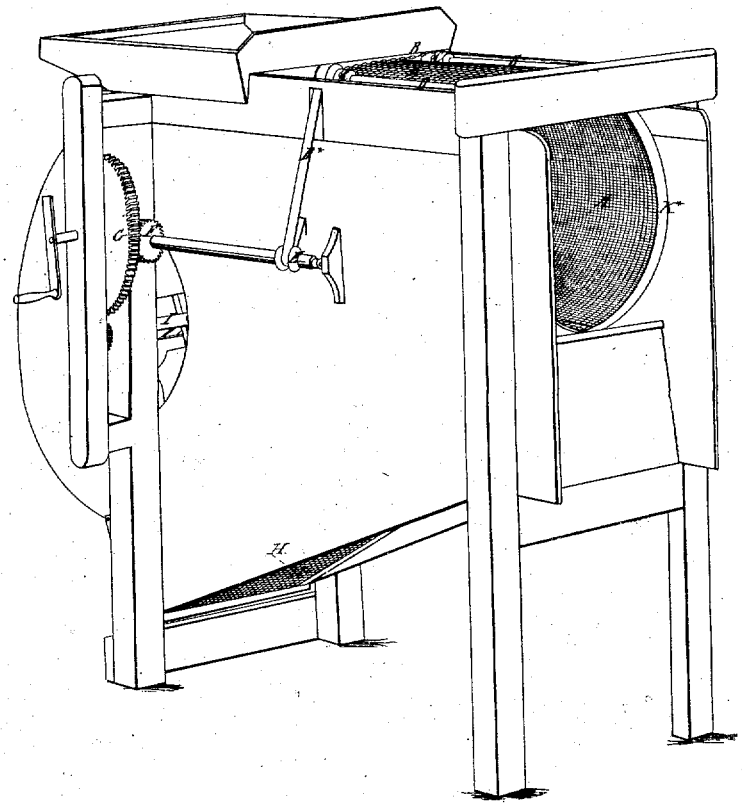

7752X
J. DEAKYNE.
WHEAT FAN OR MACHINE FOR CLEANING GRAIN.
Patented Sept. 13, 1833.
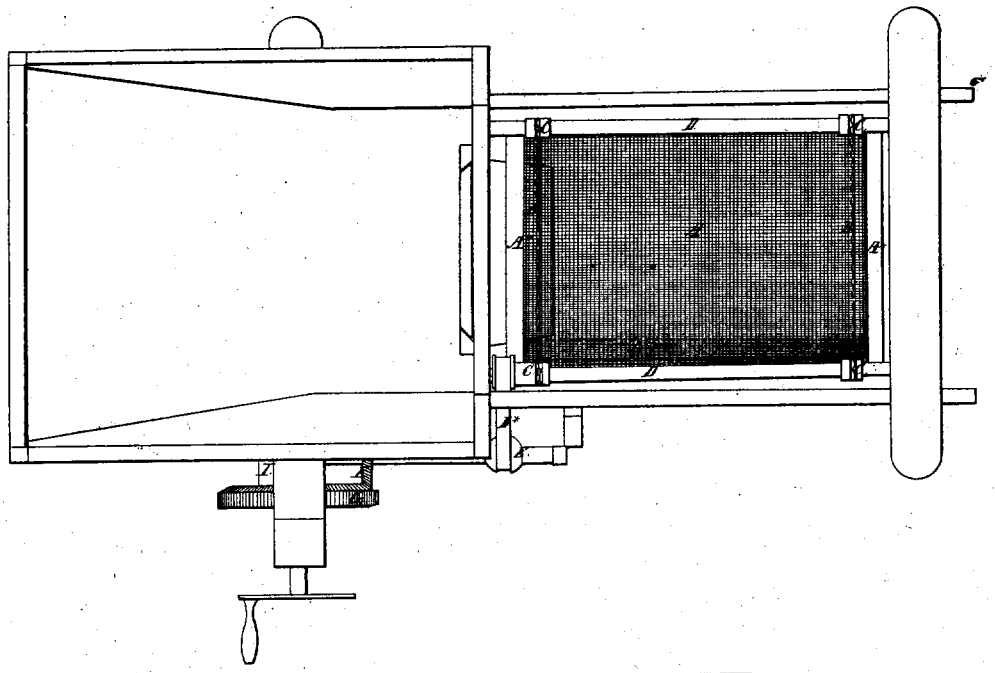
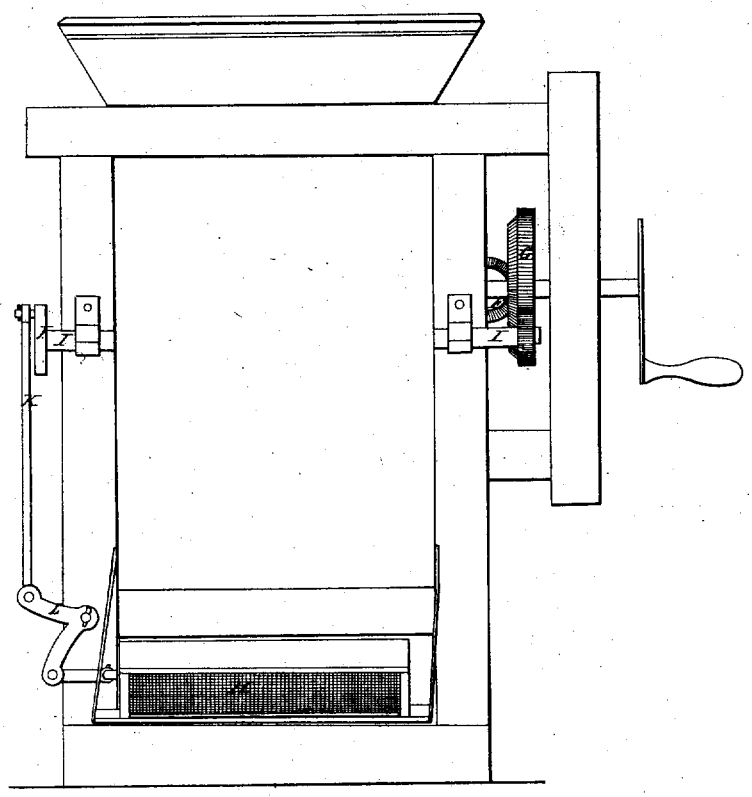

John Dralyne Petersburgh Virginia

Letters Patent

The Schedule referred to in these Letters Patent and making part of the same con-taining a description ~~a description~~ in the words of the said John Dralyne himself of his improvement in the Wheat Fan To all to whom these presents shall come Be it known that I John Dralyne of the town of Petersburgh in the County of Dinwiddie and State of Virginia have invented a new and useful improvement in the Wheat Fan or Machine for cleaning grain and that the following is a full and exact description of the construction and operation of the said machine as invented or improved by me.

In a frame of the ordinary size and construction of Wheat Fans I suspend a cylindrical wire sieve or riddle having within [illegible] hor-izontally eighteen inches diameter and twenty five inches long [illegible] of the length being turned up as a flanch at one end towards the inside to prevent the grain from [illegible] out at the end next to the wings or [illegible]; and on each end [illegible] eight [illegible] just stiff enough to preserve the spherical form of the sieve or cylinder which is made to revolve by being suspended in two straps or bands which pass over two pulleys near each end of the sieve; these pulleys may be two and a half or three inches diameter and are firmly fixed on two small iron shafts running parallel with and over the said sieve or cylinder which shafts may be placed twelve or thir-teen inches apart with one end working in the hind top cross piece as near the top edge as possible, and the other in a piece of timber fixed across the frame to receive them. On one of these shafts is fixed an additional pulley which may be four inches diameter with two narrow sides (3 inches on each side of the band) receiving a short band through the side of the fan from a pulley outside similar in size on the shaft of the outside pulley there is a small [illegible] pinion [illegible] into the side of the master wheel the turning of which by means of the working shaft [illegible] the cylinder a rotary motion. The [illegible] of the [illegible] placed in front across the cylinder and [illegible] in such a manner that all the grain may [illegible] the whole length of the [illegible] which is given a reciprocating motion derived

[illegible]

from the Shaft of the [illegible] on the end of which there is a Small Crank [illegible] having
four holes placed at different distances from its Centre for the purpose of giving the
[illegible] more or less action, a rod passing from the crank [illegible] to a [illegible]
which is Connected to the Side of the Screen by the [illegible] [illegible] a joint.
The Hopper [illegible] is permanently fixed [illegible] is placed [illegible] its Centre [illegible]
[illegible] by the front top Cross piece which has one edge bevelled [illegible] fit the bottom of the
hopper as it inclines to the Centre of the Sieve or Cylinder and projects into it one inch
beyond the flanch.

The improvement in the above described Machine which I claim
as my invention consists First in a revolving Sieve or riddle having [illegible]
[illegible] By this improvement all the interior of the Sieve is free from obstruction
to the passage of the [illegible] Chaff and grain and as a much greater Surface of [illegible]
[illegible] Attained by [illegible] the Sieve of a Cylindrical form more grain can therefore be
cleaned in the Same period of time with this improvement than by those constructed
upon the common plan with flat surfaces. Secondly the suspending the Cylinder
or Sieve [illegible] and in the manner of [illegible] it to revolve as above described.
Great advantage is gained by this part of the invention [illegible] the power is [illegible]
to give a continuous motion and none of the impelling power is wasted as is the
case with the shaking Sieve where much of the power is expended in arresting
the motion of the Sieve and imparting to it a motion in a direct contrary [illegible]

Witnesses
Exd. [illegible]
[illegible] [illegible] C Branch

[illegible]

[illegible]

(Dated September 13. 1833)
[illegible]